United States Patent Office 3,576,726
Patented Apr. 27, 1971

3,576,726
CORROSION RESISTANT COATINGS FOR CHLORINE PRODUCING ELECTROLYTIC CELLS
Roy M. Cooper, Groton, Conn., assignor to Olin Corporation, New Haven, Conn.
No Drawing. Filed Apr. 11, 1969, Ser. No. 815,490
Int. Cl. B01k 1/00; C08f 35/02
U.S. Cl. 204—128          7 Claims

ABSTRACT OF THE DISCLOSURE

Coating compositions are prepared using unsaturated polyesters, vinylaromatics and uncured Dexsil (siloxycarboranyl) polymers and copolymers. The catalysed coating compositions are cured on any of various substrates, particularly the ferrous surfaces of parts of electrolytic cells. The cured coatings resist the wet chlorine gas and chlorine-containing aqueous alkali metal brines in such cells.

---

This invention relates to novel coating compositions, the method of coating substrates therewith and the coated substrates. More particularly this invention relates to novel coating compositions based on unsaturated polyesters, vinylaromatics and Dexsil (siloxycarboranyl) polymers and copolymers. The resulting coatings are resistant to the action of wet chlorine gas and chlorine-containing aqueous alkali metal chlorine brines, for example, in electrolytic chlorine-producing cells.

Chlorine is commercially produced principally by the electrolysis of brine in electrolytic cells. The cells may be of the diaphragm or mercury type. The brine is usually sodium chloride brine, but other alkali metal chlorides, particularly potassium chloride or lithium chloride, are also electrolyzed to obtain chlorine and a caustic alkali. This invention is applicable to the electrolysis of brines of any of the alkali metal chlorides.

Ferrous parts of electrolytic cells are subject to severe corrosion in contact with the gaseous phase by wet, hot chlorine gas and in contact with the aqueous phase by hot, chlorine-containing brine. The sides and tops of mercury cells have for years been rubber lined as shown, for example, in U.S. Pats. 2,334,354; 3,140,991 and 3,198,-722. While rubber protects the iron for extended periods, it eventually deteriorates until replacement is required. The search for better and cheaper coating materials continues.

Broadly this invention comprises forming a coating composition of three components: (A) an unsaturated polyester, (B) a vinyl cross-linking agent and an uncured Dexsil (siloxycarboranyl) polymer, including mixtures and copolymers thereof, catalyzing and curing the mixture coated on any suitable substrate. The coating composition and the coated substrate are additional aspects of the invention.

More particularly the ratios of the indicated reactants, based on 100 parts by weight of polyester include from about 50 to 200 parts of cross-linking agent and from about 5 to 150 parts of Dexsil polymer. In addition, nominal amounts of peroxy catalyst and metal soap accelerator are incorporated in the coating composition prior to curing. The curing conditions are suitably the same as conventionally used for curing polyesters, namely about 150° to 250° F. for one hour or more.

Unsaturated polyesters suitable for use in the present invention are well known to the art and include, for example, glycol esters of unsaturated acids, especially poly (ethylene glycol maleate or fumarate), bisphenol-A fumarate or maleate, diallyl phthalate, diallyl maleate and trisallyl isocyanurate. It is further known to cross-link the unsaturated polyesters with vinyl monomers of styrene, dichlorostyrene, methylstyrene and methyl methacrylate. Methyl ethyl ketone peroxide is the preferred polymerization catalyst but other peroxides and hydroperoxides are suitable. Copper naphthenate and other metal salts of aliphatic and alicyclic acids are known accelerators for the polymerization reaction.

Dexsil polymers suitable for use in the present invention are the uncured siloxycarboranyl polymers prepared as described in detail in U.S. Pats. 3,388,090; 3,388,091; 3,388,092 and 3,388,093 issued June 11, 1968, to Heying et al. Mixtures of the polymers described in the recited patents are also useful. In addition, copolymers formed by using mixtures of the reactant hydrocarbyloxysiloxanes, hydrocarbylhalosiloxanes and hydrocarbylhalosilanes are useful in the present invention. Either the solid or liquid polymers and copolymers are suitable. The liquid forms are advantageous for ease of incorporation with the polyester but the solid forms confer the best thermal and chemical resistance to the final compositions.

In the method of this invention, a suitable proportion of Dexsil polymer is incorporated in the mixture of unsaturated polyester and cross-linking vinyl monomer to form a coating composition. The coating composition is catalyzed with a suitable peroxy catalyst, preferably methyl ethyl ketone peroxide or hydroperoxide and advantageously a metal soap accelerator, for example, copper naphthenate is added. The catalyzed coating composition is applied to any desired substrate and cured by suitable heating, for example, at 180° to 210° F. for 1 hour or more.

The sides and tops of mercury cathode electrolytic cells which are to be exposed to wet chlorine gas and/or chlorine-containing aqueous alkali metal chloride brine are usually of iron and are suitably coated with the catalyzed coating composition and the latter is cured according to this invention. Any other parts of the mercury cathode electrolytic cell, for example, baffles or weirs, as well as parts of other cells, for example, diaphragm cells which suffer similar exposure are appropriately protected. At elevated temperatures usually occurring in electrolytic cells, for example 70° to 85° C., these coatings out-last rubber many times. The coatings are also satisfactory for much more severe service in contact with wet chlorine and/or brine at temperatures up to 150° C. under super-atmospheric pressure.

EXAMPLE I

A mixture was prepared by adding the following components in order:

| Component | Parts by weight | Per 100 parts of polyester |
|---|---|---|
| Polyester composition (Atlac 382-05A) | 100 | 100 |
| Styrene monomer | 25 | 150 |
| Cobalt naphthenate (6% Co) | 1 | 2 |
| Dimethylaniline | 0.1 | 0.2 |
| Dexsil (powder) | 20 | 40 |
| Catalyst (methyl ethyl ketone peroxide) | 2 | 4 |

(Atlac 382–05A is a commercial polyester product consisting of 50% styrene monomer and 50% of bisphenol-A fumarate polymer.)

The mixture was painted on a steel coupon and baked at 210° F. for one hour to cure and to provide a coating resistant to chlorine gas and chlorinated aqueous sodium chloride brine.

EXAMPLE II

The Dexsil 125 polymer used in this example was a random copolymer prepared by the method disclosed in U.S. Pats. 3,388,090–3 using bis(methoxydimethylsilyl) neocarborane and a mixture of bis(chlorodimethylsilyl)

neocarborane with dimethyldichlorosilane. The molar ratio of the methoxy compound to chloro compounds was 1:1 and the molar ratio of bis(chlorodimethylsilyl) neocarbonane to dimethyldichlorosilane was 4:1. This random copolymer has randomly distributed units of the formulas:

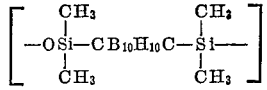

and

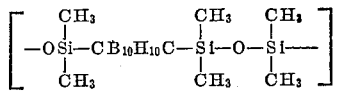

A mixture was prepared using 75 cc. of powdered Dexsil 125 which passed 80 mesh screen with 8 grams of styrene monomer. After standing 2 days, the mixture was slightly gelled. An additional 25 grams of styrene was added, followed by 100 grams of polyester composition (Atlac 382–05A), 1 gram of cobalt naphthenate (6%), 0.1 gram of dimethylaniline and 2 grams of methyl ethyl ketone peroxide.

The composition of the mixture, based on 100 parts of polyester per se was:

|  | Parts by weight |
|---|---|
| Polyester | 100 |
| Styrene monomer | 166 |
| Cobalt naphthenate | 2 |
| Dimethylaniline | 0.2 |
| Dexsil 125 | 120 |
| Catalyst | 4 |

Steel test coupons were coated with the mixture and additional coupons were coated with catalyzed polyester for comparison. All were cured by heating at 210° F. for 1 hour.

In concentrated hydrochloric acid and in 50% aqueous sodium hydroxide at room temperature of seven days, none of the coupons showed any sign of attack.

Test coupons were placed in contact with chlorinated strong brine (about 280 g.p.l. of NaCl) for 84 hours at 150° C. under 100 p.s.i.g. pressure. These conditions are more severe than encountered in an operating mercury cell. The test coupons coated with the Dexsil mixture showed no sign of attack under these conditions. When the Dexsil was omitted from a composition otherwise the same, the coating suffered severe attack under the same conditions and failed to protect the steel coupon from corrosion.

Another coupon coated with Dexsil-containing composition was placed in the endbox of an operating mercury cell in contact with acid brine at about 85° C. After 7½ months the coating was substantially unaffected.

Another coupon coated with the Dexsil-containing composition was placed in contact with chlorine gas and acid brine in the endbox of an operating mercury cell. After 4½ months it was substantially unaffected in contact with either the gas or brine phase.

What is claimed is:

1. Method of operating chlorine-producing electrolytic cells having ferrous parts by coating said ferrous parts with a coating formed by adding minor proportions of metal soap activator and of peroxy catalyst to a mixture of unsaturated polyester, vinyl cross-linking agent and uncured siloxycarboranyl polymer, said mixture containing from 5 to 150 parts by weight of said siloxycarboranyl polymer and 50 to 200 parts by weight of said vinyl cross-linking agent per 100 parts by weight of unsaturated polyester, coating said ferrous parts with the resulting mixture and curing said coating.

2. Method of operating electrolytic cells as claimed in claim 1 in which said ferrous parts are the sides and top of a mercury cathode electrolytic cell.

3. Method as claimed in claim 1 in which said siloxycarboranyl polymer is a siloxyneocarboranyl polymer.

4. Method as claimed in claim 3 in which said siloxycarboranyl polymer has randomly distributed units of the formulas:

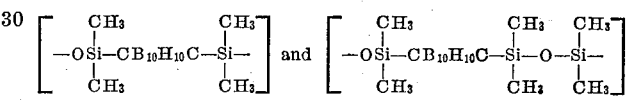

5. Method as claimed in claim 1 in which said vinyl cross-linking agent is styrene.

6. Method as claimed in claim 1 in which said unsaturated polyester is diallyl phthalate.

7. Method as claimed in claim 1 in which said unsaturated polyester is bisphenol-A fumarate.

References Cited

UNITED STATES PATENTS

| 3,436,324 | 4/1969 | Hass et al. | 204—242X |
| 3,450,621 | 6/1969 | Anderson | 204—219 |
| 3,527,688 | 9/1970 | Giacopelli | 204—242 |

JOHN H. MACK, Primary Examiner

D. R. VALENTINE, Assistant Examiner

U.S. Cl. X.R.

117—161; 204—219, 242, 250, 279; 260—827